(12) United States Patent
Ramakrishna et al.

(10) Patent No.: US 11,694,194 B2
(45) Date of Patent: Jul. 4, 2023

(54) USABLE SECURITY WITH SOCIAL NETWORK ASSISTANCE

(71) Applicant: International Business Machines Corporation, Armonk, NY (US)

(72) Inventors: Venkatraman Ramakrishna, New Delhi (IN); Prashant Sachan, Amethi (IN); Saurabh Srivastava, New Delhi (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2091 days.

(21) Appl. No.: 14/558,204

(22) Filed: Dec. 2, 2014

(65) Prior Publication Data

US 2016/0155188 A1 Jun. 2, 2016

(51) Int. Cl.
*G06Q 40/02* (2023.01)
*G06Q 50/00* (2012.01)
*G06Q 20/38* (2012.01)
*H04L 9/40* (2022.01)
(Continued)

(52) U.S. Cl.
CPC ......... *G06Q 20/3821* (2013.01); *G06F 21/31* (2013.01); *G06Q 40/02* (2013.01); *H04L 9/3215* (2013.01); *H04L 63/083* (2013.01); *G06Q 50/01* (2013.01); *G06Q 2220/00* (2013.01); *H04L 2209/56* (2013.01)

(58) Field of Classification Search
CPC .................................................... G06Q 40/02
See application file for complete search history.

(56) References Cited

U.S. PATENT DOCUMENTS

| 7,945,653 B2 * | 5/2011 | Zuckerberg | G06F 16/58 |
| | | | 709/223 |
| 8,250,632 B1 * | 8/2012 | Staddon | H04L 63/08 |
| | | | 726/4 |
| 8,782,761 B1 | 7/2014 | Staddon | |

(Continued)

FOREIGN PATENT DOCUMENTS

WO    WO2014106422 A1    7/2014

OTHER PUBLICATIONS

Bijan Soleymani and Muthucumaru Maheswaran, Social Authentication Protocol for Mobile Phones, 2009, 2009 International Conference on Computational Science and Engineering, p. 437 (Year: 2009).*

(Continued)

*Primary Examiner* — Mamon Obeid
*Assistant Examiner* — Zehra Raza
(74) *Attorney, Agent, or Firm* — Ference & Associates LLC

(57) ABSTRACT

Methods and arrangements for effecting authentication in a secure transaction. There are defined, on behalf of a user, individuals who are members of a social network of the user. There is received, from the user, a transaction request for a secure transaction. An authentication test is conducted with the user and, upon meeting a predetermined requirement of the authentication test, the transaction request is validated. The authentication test requests the user to confirm at least one information item related to at least one member of the user's social network. Other variants and embodiments are broadly contemplated herein.

6 Claims, 6 Drawing Sheets

(51) Int. Cl.
*H04L 9/32* (2006.01)
*G06F 21/31* (2013.01)

(56) References Cited

U.S. PATENT DOCUMENTS

| | | | | |
|---|---|---|---|---|
| 8,881,251 | B1* | 11/2014 | Hilger | G06F 21/31 |
| | | | | 726/7 |
| 10,229,260 | B1* | 3/2019 | Bowers | H04L 9/32 |
| 2004/0243514 | A1* | 12/2004 | Wankmueller | G07C 9/257 |
| | | | | 705/40 |
| 2008/0033739 | A1* | 2/2008 | Zuckerberg | G06Q 10/10 |
| | | | | 705/319 |
| 2008/0148366 | A1* | 6/2008 | Wahl | G06F 21/36 |
| | | | | 726/4 |
| 2008/0255977 | A1* | 10/2008 | Altberg | G06Q 30/02 |
| | | | | 707/E17.014 |
| 2010/0229223 | A1 | 9/2010 | Shepard et al. | |
| 2012/0210409 | A1 | 8/2012 | Lin et al. | |
| 2015/0193683 | A1* | 7/2015 | Freed | G06N 5/02 |
| | | | | 706/11 |

OTHER PUBLICATIONS

Unknown—Disclosed Anonymously, "%RBS% Method and Apparatus for User Authentication Based on Dynamic Question-Answer Generation from Social Networks Data", An IP.com Prior Art Database Technical Disclosure, IP.com No. IPCOM000216026D, IP.com Electronic Publication: Mar. 19, 2012, 4 pages, Copy available at https://priorart.ip.com/IPCOM/000216026, IP.com.

* cited by examiner

USABLE SECURITY WITH SOCIAL NETWORK ASSISTANCE

BACKGROUND

The advent of mobile phones (including smartphones), as well as of other portable devices, has permitted users to conduct complex secure transactions; these include financial transactions associated with bank accounts. Generally, in accessing the mobile banking capability of a financial institution (e.g., which permits access, via a mobile phone, to a personal bank account and to one or more functions associated therewith), a customer or user typically registers with the institution for the service and establishes authorization credentials (such as a password) for verification. As such, every sensitive transaction normally requires a user to provide credentials or private information known only to him or her; this could include, e.g., a PIN number (personal identification number), password, or credit card CVV (card verification value) number.

However, shortcomings and inefficiencies have been encountered with conventional arrangements. Generally, it can be difficult and non-intuitive for users with bank accounts to conduct and approve financial transactions (or other secure transactions) through their mobile phones using available authentication mechanisms. For instance, security mechanisms that require users to manually type numbers (e.g., PIN numbers) on their phones can be error-prone and insecure, given that different users may have been initiated towards such tasks in different manners; many might find the process too complex and cumbersome.

BRIEF SUMMARY

In summary, one aspect of the invention provides a method of effecting authentication in a secure transaction, the method comprising: utilizing at least one processor to execute computer code configured to perform the steps of: defining, on behalf of a user, individuals who are members of a social network of the user; receiving, from the user, a transaction request for a secure transaction; conducting an authentication test with the user; and upon meeting a predetermined requirement of the authentication test, validating the transaction request; wherein the authentication test requests the user to confirm at least one information item related to at least one member of the user's social network.

Another aspect of the invention provides an apparatus for effecting authentication in a secure transaction, the apparatus comprising: at least one processor; and a computer readable storage medium having computer readable program code embodied therewith and executable by the at least one processor, the computer readable program code comprising: computer readable program code configured to define, on behalf of a user, individuals who are members of a social network of the user; computer readable program code configured to receive, from the user, a transaction request for a secure transaction; computer readable program code configured to conduct an authentication test with the user; and computer readable program code configured to validate the transaction request upon meeting a predetermined requirement of the authentication test; wherein the authentication test requests the user to confirm at least one information item related to at least one member of the user's social network.

A further aspect of the invention provides a computer program product for effecting authentication in a secure transaction, the computer program product comprising: a computer readable storage medium having computer readable program code embodied therewith, the computer readable program code comprising: computer readable program code configured to define, on behalf of a user, individuals who are members of a social network of the user; computer readable program code configured to receive, from the user, a transaction request for a secure transaction; computer readable program code configured to conduct an authentication test with the user; and computer readable program code configured to validate the transaction request upon meeting a predetermined requirement of the authentication test; wherein the authentication test requests the user to confirm at least one information item related to at least one member of the user's social network.

An additional aspect of the invention provides a method, comprising: defining, on behalf of a user, individuals who are members of a social network of the user; receiving, from the user, a transaction request for a secure transaction; conducting an authentication test with the user; and upon meeting a predetermined requirement of the authentication test, validating the transaction request; wherein the authentication test requests the user to: answer a question prerecorded by a member of the user's social network, wherein the question is selected from a store of questions and answers; and provide an answer to the question within a predetermined time duration; wherein the conducting of an authentication test comprises providing a hint to the user regarding the predetermined time duration; and permitting a member of the user's social network to update one or more of the questions and answers.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

Specific reference will now be made here below to FIG. 1-4. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 6. In accordance with an exemplary embodiment, most if not all of the process steps, components and outputs discussed with respect to FIGS. 1-4 can be performed or utilized by way of a processing unit or units and system memory such as those indicated, respectively, at 16' and 28' in FIG. 6, whether on a server computer, a client computer, a node computer in a distributed network, or any combination thereof.

Figure 1:
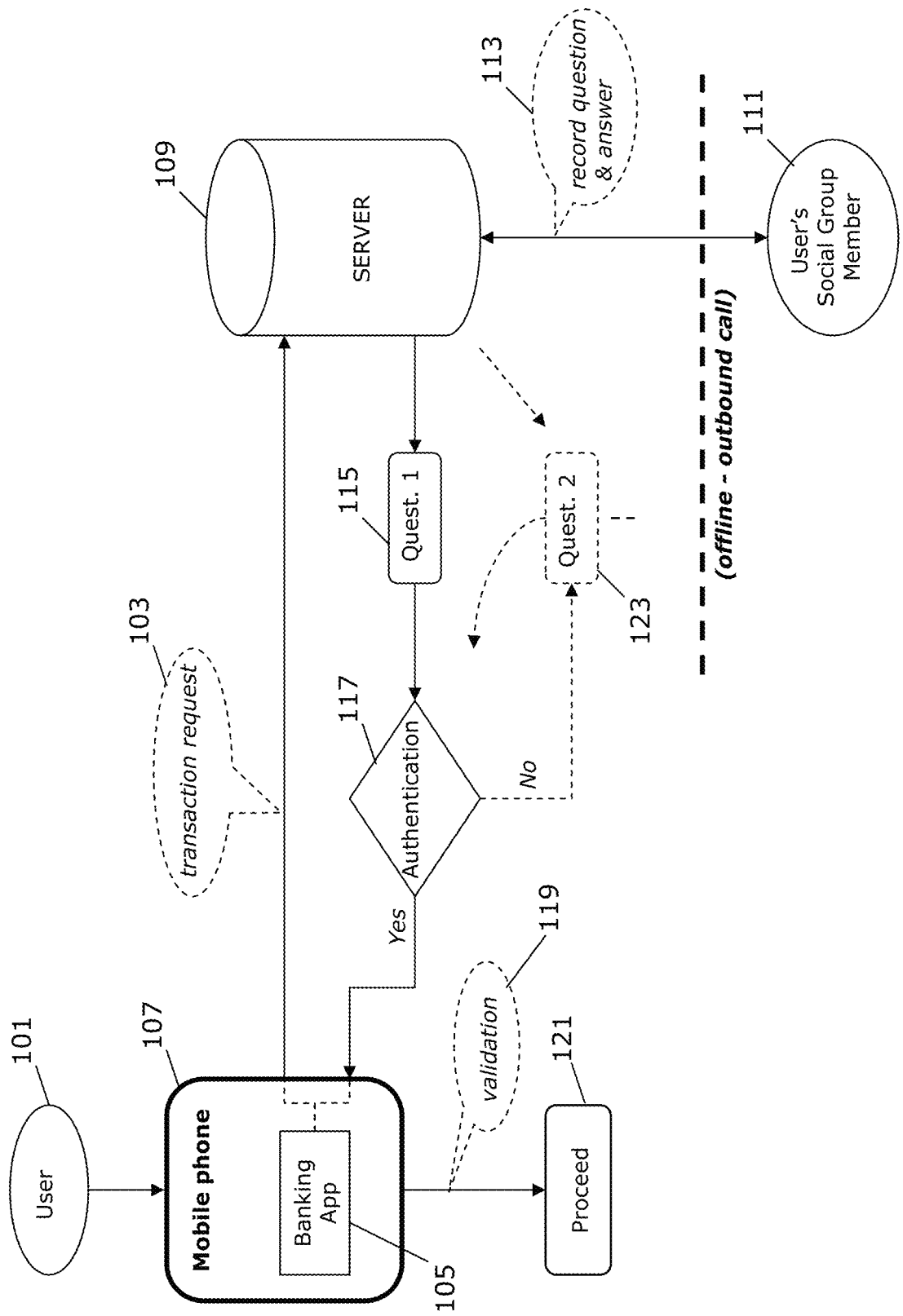
FIG. 1 schematically illustrates an authentication method and arrangement by way of questions and answers involving a social network contact.
Figure 2:
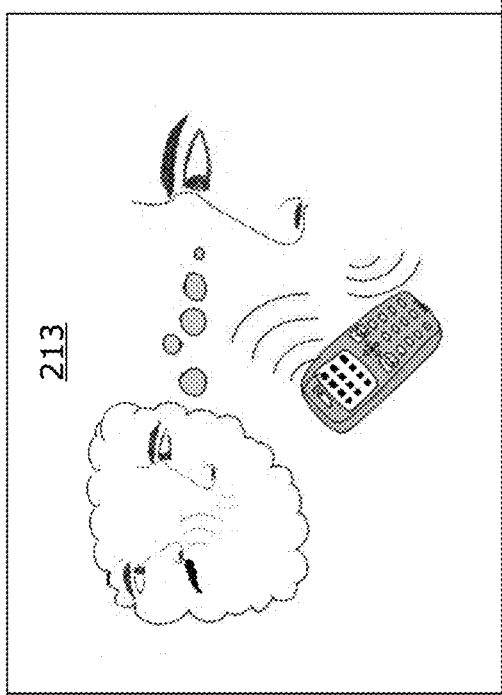
FIG. 2 schematically illustrates authentication steps via a question and answer.
Figure 2:
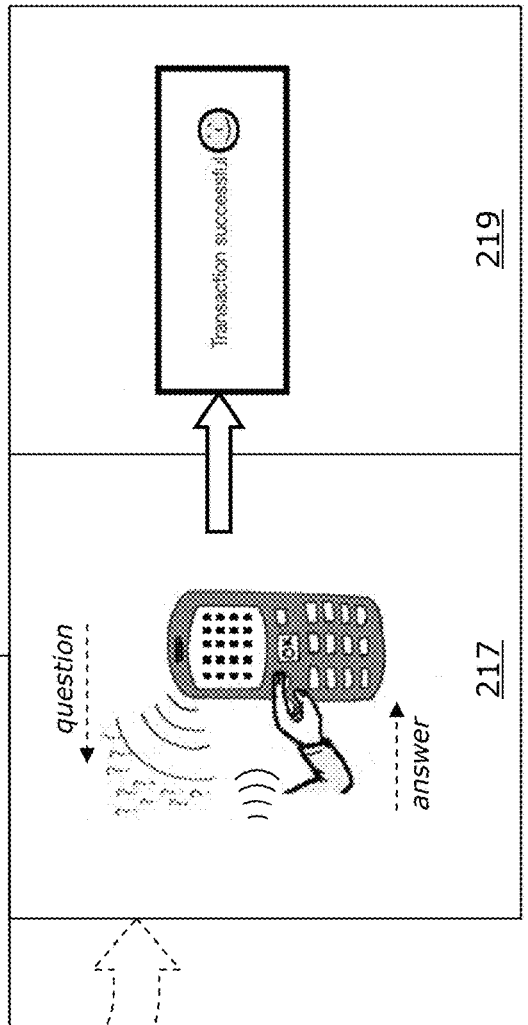
Figure 3:
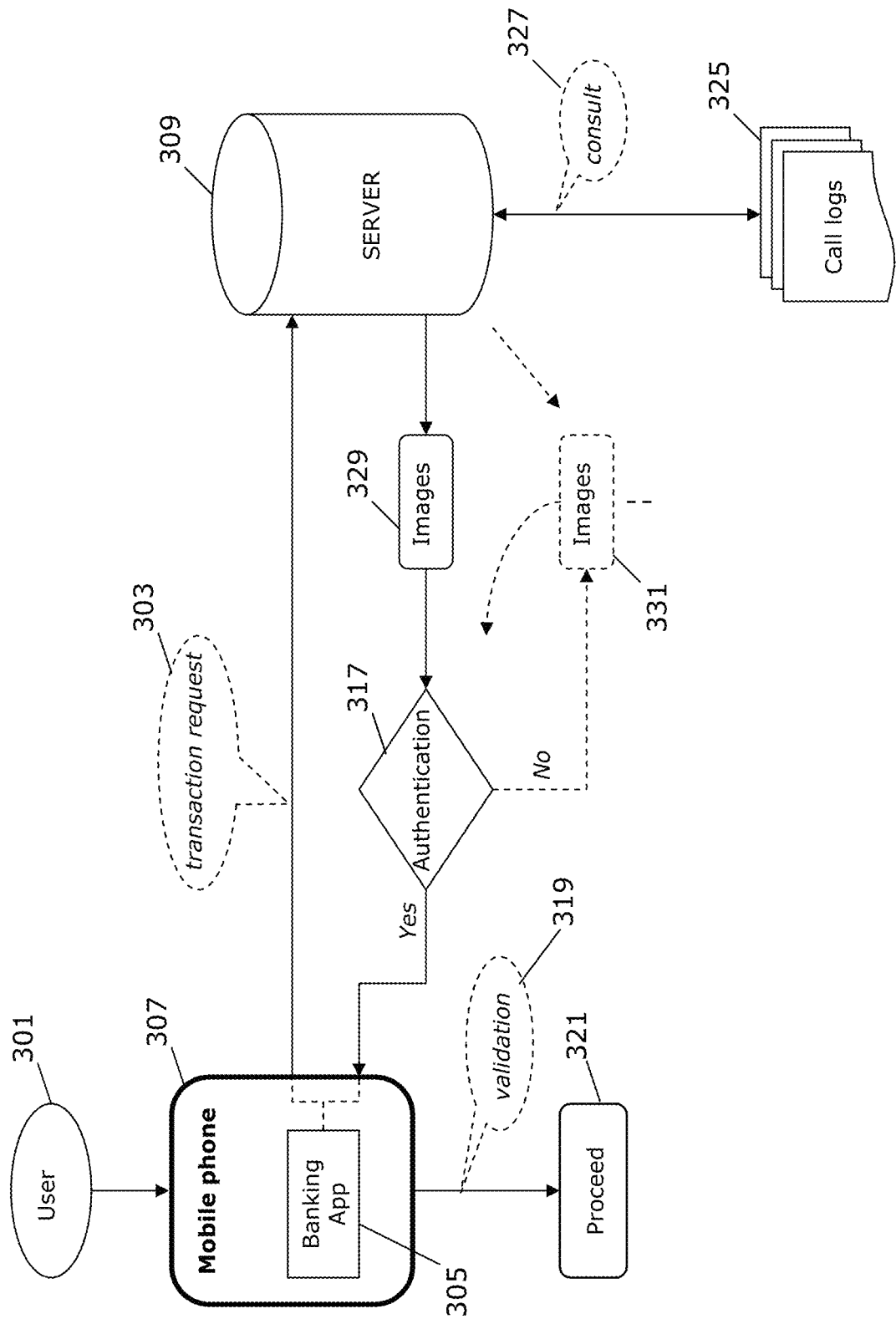
FIG. 3 schematically illustrates an authentication method and arrangement by way of a rearrangement of images.
Figure 4:
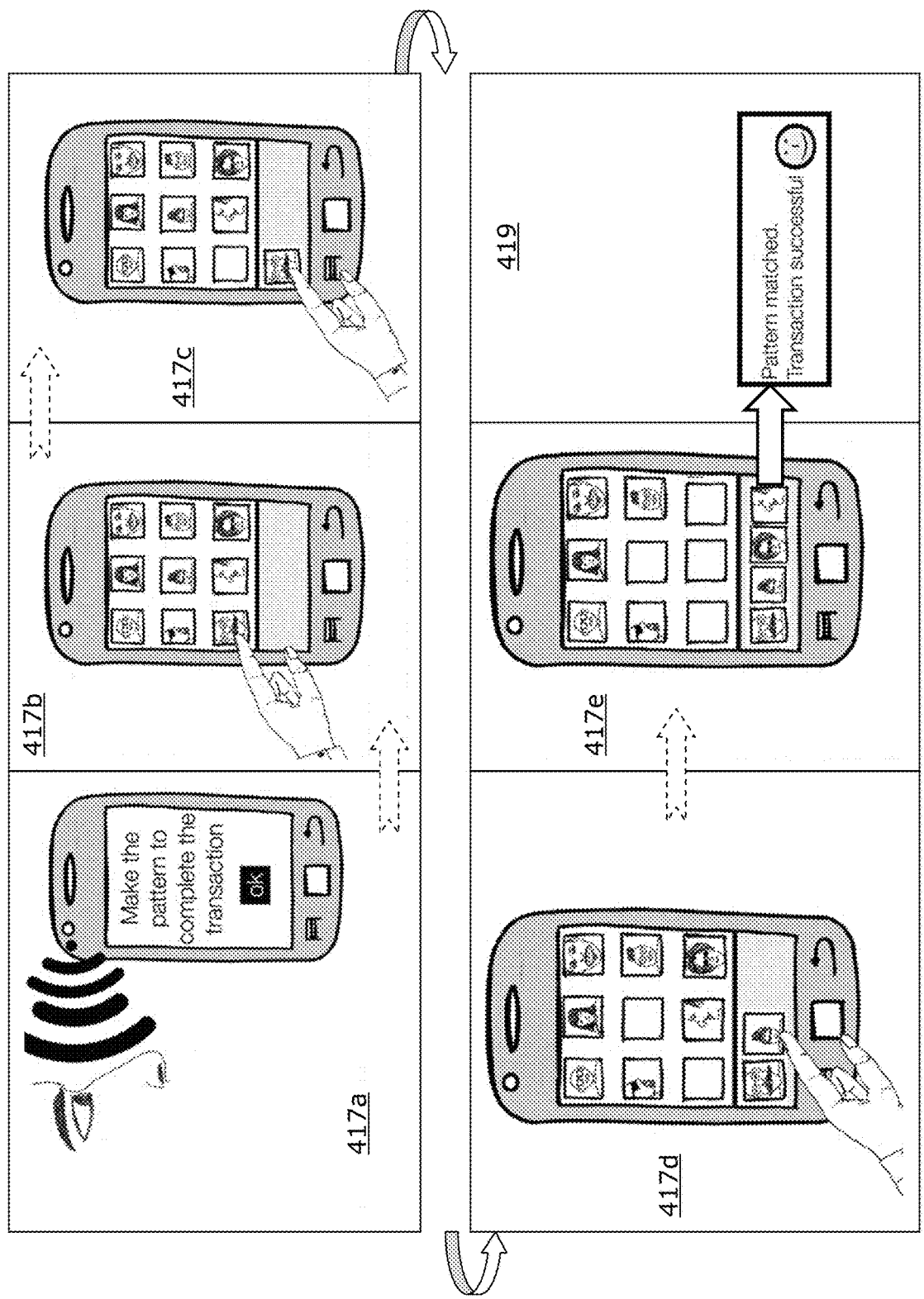
FIG. 4 schematically illustrates authentication steps via a rearrangement of images.

To facilitate easier reference, in advancing from FIG. 1 to and through FIG. 4, a reference numeral is advanced by a multiple of 100 in indicating a substantially similar or analogous component or element with respect to at least one component or element found in at least one earlier figure among FIGS. 1-4.

Broadly contemplated herein, in accordance with at least one embodiment of the invention, are methods and arrangements which provide authentication of a user, who is performing a sensitive transaction, by way of the user's social network connections. The user can authenticate him- or herself by correctly identifying the voice of a member of his social network and answering a question related to their private relationship. An individual who also is a social network connection of the user can post a personal question into a system for the user to authenticate him- or herself in the future. In an embodiment, this social network connection of the user can be randomly selected to pose an authenticating question that may be used during a secure session (such as a banking session). If a predetermined time duration passes, the user may be provided with a verbal cue after a particular time duration as a hint to help determine how to phrase the answer to the authenticating question. In a variant embodiment, a persistent background sound can be played that tapers off within a particular time duration, to thereby serve as a hint to help determine how to phrase the answer to an authenticating question.

Moreover, in accordance with at least one embodiment of the invention, there are broadly contemplated herein methods and arrangements for a user to authenticate him- or herself by ranking a set of images of his/her social network members based on his closeness to them. An application can then authenticate the user by validating this ranking of images. The user's ranking can be matched with a telephonic calling pattern, by way of example. Alternatively, there can be generated a ranked list of a user's social network members based on his/her closeness to them by assessing the user's social networking activity; this list can then be matched with the user's own ranking A user can update his or her list of social network contacts who are permitted to set authentication questions by adding, removing or reordering the same, e.g., via interactive voice response (IVR). A user can also remove one or more questions stored in a database, e.g., through IVR. Further, via an arrangement such as IVR, a user's social network contact (or connection) can change one or more among the set of questions saved earlier, via providing the identity of the user; such changes can then be saved until the user approves or rejects them (e.g., via IVR), while the user may be notified of the changes via one or more voice or text messages.

The features discussed above, and others, relating to at least one embodiment of the invention, will be better appreciated from the discussion which follows.

As generally understood herein, in accordance with at least one embodiment of the invention, a "social network" can encompass essentially any set of relationships that a user has with one or more individuals, either via general personal acquaintance or via online social networking, or both. Such individuals can be referred to (e.g., in the ensuing discussion) as social network "contacts" or "connections", or "members" of the social network.

In accordance with at least one embodiment of the invention, mobile banking users can be authenticated through social network connections. As such, users can be identified (or ranked or selected) by friends, relatives and acquaintances, via voice interface or a GUI (graphical user interface).

In accordance with at least one embodiment of the invention, it can be recognized that, in a broad and general sense, users have social networks comprising friends, relatives and acquaintances. Accordingly, methods and arrangements as broadly contemplated herein will permit a user-friendly and intuitive mechanism to facilitate stand-alone authentication protocols, or protocols employed in conjunction with other methods. Any and all private user data are collected by an impersonal system, and are stored in an obfuscated form (e.g., using encryption) at a back end to prevent identity theft or any other misuse of data (e.g., user account data, names social network members, recorded questions, images, voice samples, etc.).

In accordance with at least one embodiment of the invention, in a voice-based authentication protocol, a user initiates a mobile banking transaction and completes initial steps leading to a sensitive request (e.g., money transfer, bank balance inquiry). A system associated with a bank selects a pre-recorded question posed by a member of the user's social network, and plays it back. The answer to this question represents a shared secret possessed by the user and the questioner. The question can be based on recent conversations, private topics, events, or experiences that the questioner believes only the user is capable of knowing and answering.

FIG. 1 schematically illustrates an authentication method and arrangement by way of questions and answers involving a social network contact, in accordance with at least one embodiment of the invention. As shown, a user 101 initiates a transaction request 103 via a banking application (or app) 105 of his/her mobile phone 105. The request 103 is sent to a backend server 109. As discussed and alluded to above, a user's social group member 111 will have recorded (113) a question and answer via an offline (outbound) call placed by the server 109, both of which are stored within the server 109. To authenticate the transaction request 103, the question 115 is directed to the user 101 and, if successfully authenticated (at 117), validation (119) is considered complete, and the desired transaction may proceed (121). If authentication (117) is not successful, then one or more additional questions (123) may be attempted of the user until authentication is successful or a predetermined number of attempts have been exhausted.

FIG. 2 schematically illustrates authentication steps via a question and answer, in accordance with at least one embodiment of the invention. As shown, a user's social network contact may record (213) a question and answer based, e.g., on a conversation they had about a personal or local matter earlier in a given day. The user then (217) listens to the question and authenticates via verbally uttering an answer when prompted, which—if correct—prompts a confirmation of validation (219); such confirmation can be displayed on the screen of the user's phone.

In accordance with at least one embodiment of the invention, in a dynamic authentication protocol, a member of the user's social network is chosen dynamically and then contacted in order to pose a question that only the user can answer. Such a call may also be made automatically (e.g., as a system-generated call, without any human intervention.).

In accordance with at least one embodiment of the invention, any of a wide variety of mechanisms may be employed to verify a correct answer by a user. As such, it can be recognized that there may be a variety of ways to utter a correct answer (e.g., single word, phrase or full sentence). Thus, "1 Jan. 1968" may be regarded as a similarly correct answer as "My birthday falls on 1 Jan. 1968". Inasmuch as only one version of an answer will typically be saved, a back-end system may be configured to provide a hint to the user being authenticated; the user may then take note of this hint to in order to the provide a correct version of an answer. Thus, for example, the system can make a cut-off sound or play back a message upon expiration of a specific duration corresponding to the audio length of the saved answer. The authentication can be regarded as a failure if the user is cut off, or if there is a long pause after the user completes his/her answer. A few attempts may be permitted in order for the user to be reminded of the expected length of the answer. In a variant embodiment, a persistent background sound can taper off within a predetermined duration. None of the duration-based hints described here are likely to be of help to an unauthorized intruder, as only the duration of an answer will become apparent to such an intruder, as opposed to the content of the answer itself.

In accordance with at least one embodiment of the invention, an authentication protocol may be GUI-based instead of voice-based. Here, a set of photos is displayed to the user on his/her mobile device. The user is then asked to rank and rearrange the photos (e.g., via motion of the user's fingertip [s] on the screen) based on what he/she understands to be his degree of closeness to them. The back-end system may then validate the user's selection on any of a variety of criteria, including: matching with a ranking order pre-specified by the user at an earlier time (e.g., during bootstrap/initialization); or matching with the user's telephonic calling profile, given an assumption that closer social network members have more frequent phone conversations with the user (whether measured, e.g., in terms of a number of calls, a summed quantity of aggregate minutes for phone calls, and or any factor such as these weighted on a basis of recency). In the latter instance, the user may proceed with his/her ranking and rearranging on a basis of some knowledge of the frequency or degree of contact with members of the social network; he/she may also be provided with a predetermined number of attempts at rearranging before the authentication is deemed by the back-end system to be a failure. In a variant embodiment, validation of a user's ranking/rearranging of photos may be undertaken via consulting the user's online social network activity (to the extent compatible with user permissions).

Accordingly, FIG. 3 schematically illustrates an authentication method and arrangement by way of a rearrangement of images, in accordance with at least one embodiment of the invention. Here, as shown, when a transaction request 303 is sent to server 309, call logs 325 of the user are consulted (327), and the user is then shown a display of images 329 (produced from storage in the server 309) to rearrange or order by way of authentication 317. If authentication is not successful, one or more other sets of images 331 are produced (from server 309) to permit additional attempts by the user, until authentication is successful or a predetermined number of attempts have been exhausted. Again, once authentication 317 is successful, validation 319 is considered complete.

FIG. 4 schematically illustrates authentication steps via a rearrangement of images, in accordance with at least one embodiment of the invention. As shown, to authenticate, a user is prompted (417*a*) to arrange a pattern of images in order to complete a requested transaction. By way of an illustrative and non-restrictive working example, the user chooses one image (417*b*), drags it into a lower panel (417*b*) and then does the same with one more image (417*c*) and then others until a predetermined number are located in the lower panel (417*d*); here, the user's task is to drag and order four images. Thus, by way of example, the user may understand that he or she is to select the top four members of his/her social network from among an initial display (here, comprising nine images) and order them correctly in accordance with predetermined criteria (e.g., the frequency of phone calls with each social network member). If, in accordance with the present working example, the top four images are correct, there is prompted a confirmation of validation (419) which can be displayed on the screen of the user's phone.

Generally, in accordance with at least one embodiment of the invention, any of a variety of mechanisms can be employed for updates, e.g., to authentication methods. For instance, the user can add or remove names from a list of social network contacts, reorder the relative priority of the contacts, and select or deselect any questions saved by these contacts. Any of these actions can be performed via IVR, which itself may be voice-activated, or activatable via buttons. Members of the social network themselves can change any and all saved questions and their answers (e.g., add, remove or update). Such actions may also be performed interactively via IVR.

In accordance with at least one embodiment of the invention, when a social network contact makes any changes to questions or answers, the changes may be saved but suspended (from implementation) pending approval of the account holder (or user). As long as one or more changes are pending without review by the user, the back-end system may automatically attempt to seek a decision (i.e., approval or rejection) of one or more changes, e.g., by periodically calling the user or sending a text, or providing a reminder to the user upon his/her logging into the account. The user may then approve or reject any changes through IVR options.

It should be understood and appreciated, in accordance with at least one embodiment of the invention, that while the discussion herein focuses at least to some extent on mobile banking, embodiments may be employed in essentially any of a wide variety of contexts and settings where there is a need for secure authentication (among other possible needs). Also, inasmuch as the discussion herein has focused at least to some extent on mobile phones and smartphones as an operating context, it should be understood and appreciated that solutions as broadly contemplated herein may be employed on other devices such as laptop, tablet and desktop computers.

In accordance with at least one embodiment of the invention, quantitative values as determined herein can be stored in memory or displayed to a user on a screen, as might fit the needs of one or more users.

Figure 5:
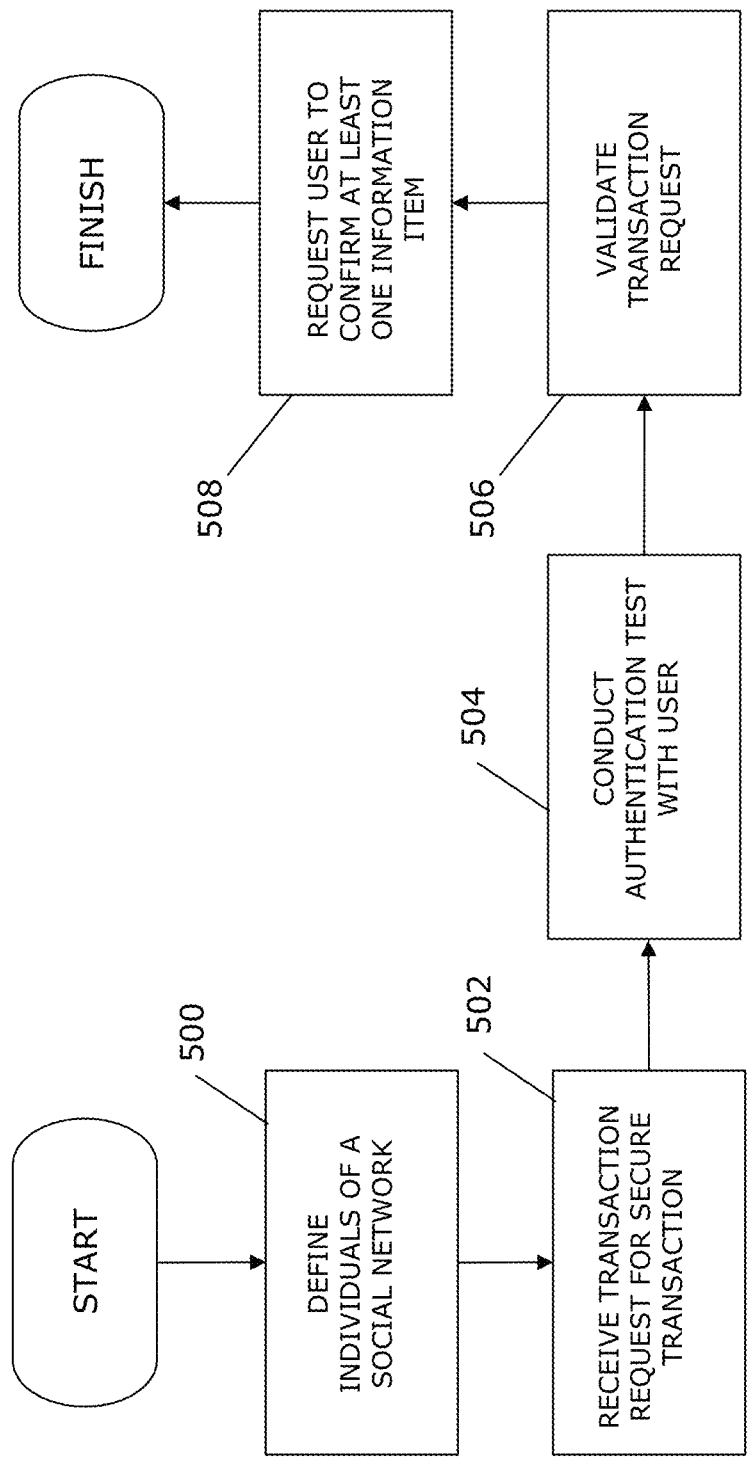
FIG. 5 sets forth a process more generally for effecting authentication in a secure transaction.

FIG. 5 sets forth a process more generally for effecting authentication in a secure transaction, in accordance with at least one embodiment of the invention. It should be appreciated that a process such as that broadly illustrated in FIG. 5 can be carried out on essentially any suitable computer system or set of computer systems, which may, by way of an illustrative and non-restrictive example, include a system such as that indicated at 12' in FIG. 6. In accordance with an example embodiment, most if not all of the process steps discussed with respect to FIG. 5 can be performed by way of a processing unit or units and system memory such as those indicated, respectively, at 16' and 28' in FIG. 6.

As shown in FIG. 5, in accordance with at least one embodiment of the invention, there are defined, on behalf of a user, individuals who are members of a social network of the user (500). There is received, from the user, a transaction request for a secure transaction (502). An authentication test is conducted with the user (504) and, upon meeting a predetermined requirement of the authentication test, the transaction request is validated (506). The authentication test requests the user to confirm at least one information item related to at least one member of the user's social network (508).

Figure 6:
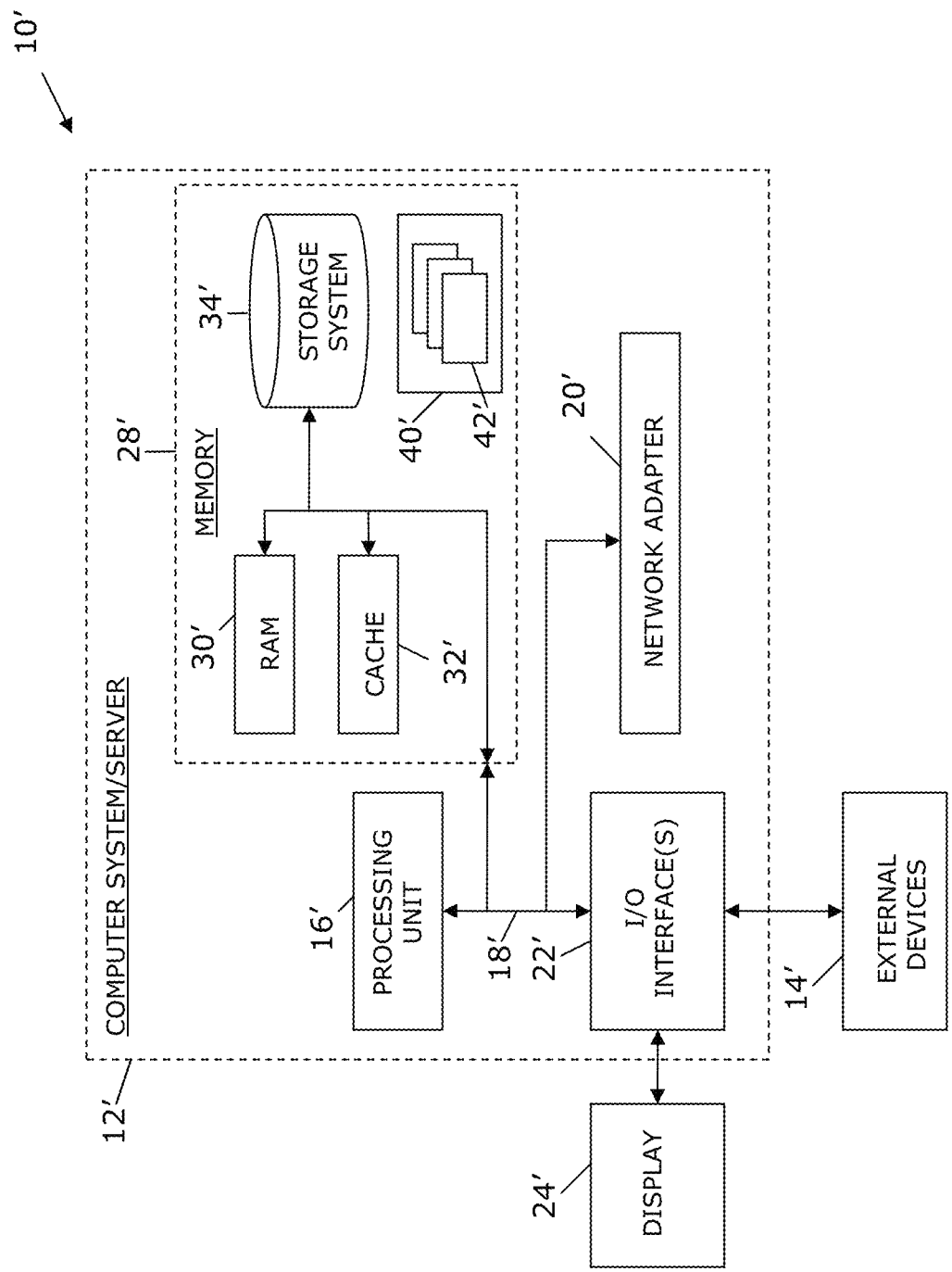
FIG. 6 illustrates a computer system.

Referring now to FIG. 6, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of effecting authentication in a secure transaction, said method comprising:
   defining, on behalf of a user and utilizing an interactive voice response system, individuals who are members of a social network of the user, wherein the members are ranked based upon a relationship between at least one member and the user, wherein the defining comprises receiving input via the interactive voice response system from the user to modify a ranking of the members;
   receiving, from the user utilizing an information handling device, a transaction request for a secure transaction, wherein the transaction request is initiated on an application of the information handling device;
   conducting, utilizing a voice-based authentication protocol triggered by the application in response to the transaction request, an authentication test with the user, wherein the conducting comprises:
      randomly selecting one of the one or more members of the user's social network, wherein each of the one or more members has at least one corresponding pre-recorded question and wherein each of the pre-recorded questions is associated with an aspect of the relationship between the user and the corresponding member and is stored in a store of questions and answers;
      selecting, from the store of questions and answers, one of the at least one corresponding pre-recorded questions of the selected one of the one or more members; and
      presenting the selected pre-recorded question to the user, wherein the presenting comprises automatically calling the information handling device of the user and playing an audio version of the pre-recorded question, wherein the presenting comprises providing a hint to a stored correct answer to the question, wherein the hint is based upon a duration of the stored correct answer;
   validating, using a validation mechanism and responsive to receiving an audible version of the correct answer to the question from the user during the automatic call received at the information handling device, the transaction request, wherein the validation mechanism comprises identifying a provided answer is a similarly correct answer to the stored correct answer and wherein the user is prompted to provide a new answer in view of the hint responsive to determining a provided answer is outside a threshold of the duration of the stored answer and identified from the hint, wherein the validating comprises accepting one or more provided answers until: authenticating the provided answer or a predetermined amount of attempts for providing a correct answer has been exhausted; and
   updating the validation mechanism by receiving an update of one or more of the questions and answers in the store from a member of the user's social network and receiving approval from the user regarding the update to one or more of the questions and answers.

2. The method according to claim 1, wherein the authentication test requests the user to provide an answer within a predetermined time duration.

3. The method according to claim 2, wherein said conducting of an authentication test comprises providing a hint to the user regarding the predetermined time duration.

4. An apparatus for effecting authentication in a secure transaction, said apparatus comprising:
   at least one processor; and
   a computer readable storage medium having computer readable program code embodied therewith and, when executed by the at least one processor, causes the at least one processor to;
   define, on behalf of a user and utilizing an interactive voice response system, individuals who are members of a social network of the user, wherein the members are ranked based upon a relationship between at least one member and the user, wherein the defining comprises receiving input via the interactive voice response system from the user to modify a ranking of the members;
   receive, from the user utilizing an information handling device, a transaction request for a secure transaction, wherein the transaction request is initiated on an application of the information handling device;
   conduct, utilizing a voice-based authentication protocol triggered by the application in response to the transaction request, an authentication test with the user, wherein the conducting comprises:
      randomly select one of the one or more members of the user's social network, wherein each of the one or more members has at least one corresponding pre-recorded question and wherein each of the pre-recorded questions is associated with an aspect of the relationship between the user and the corresponding member and is stored in a store of questions and answers;
      selecting, from the store of questions and answers one of the at least one corresponding pre-recorded questions of the selected one of the one or more members, wherein the selecting comprises accessing an impersonal system storing the at least one corresponding pre-recorded questions in an obfuscated form for encrypting the aspect of the relationship between the user and the corresponding member; and
      presenting the selected pre-recorded question to the user, wherein the presenting comprises automatically calling the information handling device of the user and playing an audio version of the pre-recorded question, wherein the presenting comprises providing a hint to a stored correct answer to the question, wherein the hint is based upon a duration of the stored correct answer; and validate, using a validation mechanism and responsive to receiving an audible version of the correct answer to the question from the user during the automatic call received at the information handling device, the transaction request, wherein the validation mechanism comprises identifying a provided answer is a similarly correct answer to the stored correct answer and wherein the user is prompted to provide a new answer in view of the hint responsive to determining a provided answer is outside a threshold of the duration of the stored answer and identified from the hint, wherein the validating comprises accepting one or more provided answers until: authenticating the provided answer or a predetermined amount of attempts for providing a correct answer has been exhausted; and update the validation mechanism by receiving an update of one or more of the questions and answers in the store from a member of the user's social network and receiving approval from the user regarding the update to one or more of the questions and answers.

5. A computer program product for effecting authentication in a secure transaction, said computer program product comprising:

a computer readable storage medium having computer readable program code embodied therewith, and, when executed by a processor, cause the processor to:

define, on behalf of a user and utilizing an interactive voice response system, individuals who are members of a social network of the user, wherein the members are ranked based upon a relationship between at least one member and the user, wherein the defining comprises receiving input via the interactive voice response system from the user to modify a ranking of the members;

receive, from the user utilizing an information handling device, a transaction request for a secure transaction, wherein the transaction request is initiated on an application of the information handling device;

conduct, utilizing a voice-based authentication protocol triggered by the application in response to the transaction request, an authentication test with the user, wherein the conducting comprises:

randomly select one of the one or more members of the user's social network, wherein each of the one or more members has at least one corresponding pre-recorded question and wherein each of the pre-recorded questions is associated with an aspect of the relationship between the user and the corresponding member and is stored in a store of questions and answers;

selecting, from the store of questions and answers one of the at least one corresponding pre-recorded questions of the selected one of the one or more members, wherein the selecting comprises accessing an impersonal system storing the at least one corresponding pre-recorded questions in an obfuscated form for encrypting the aspect of the relationship between the user and the corresponding member; and presenting the selected pre-recorded question to the user, wherein the presenting comprises automatically calling the information handling device of the user and playing an audio version of the pre-recorded question, wherein the presenting comprises providing a hint to a stored correct answer to the question, wherein the hint is based upon a duration of the stored correct answer; and validate, using a validation mechanism and responsive to receiving an audible version of the correct answer to the question from the user during the automatic call received at the information handling device, the transaction request, wherein the validation mechanism comprises identifying a provided answer is a similarly correct answer to the stored correct answer and wherein the user is prompted to provide a new answer in view of the hint responsive to determining a provided answer is outside a threshold of the duration of the stored answer and identified from the hint, wherein the validating comprises accepting one or more provided answers until: authenticating the provided answer or a predetermined amount of attempts for providing a correct answer has been exhausted; and update the validation mechanism by receiving an update of one or more of the questions and answers in the store from a member of the user's social network and receiving approval from the user regarding the update to one or more of the questions and answers.

6. The computer program product according to claim 5, wherein the authentication test requests the user to provide an answer within a predetermined time duration.

* * * * *